Feb. 11, 1936.  F. C. NILSON  2,030,464
TESTING DEVICE FOR THREADED ARTICLES
Filed July 14, 1933  2 Sheets-Sheet 2
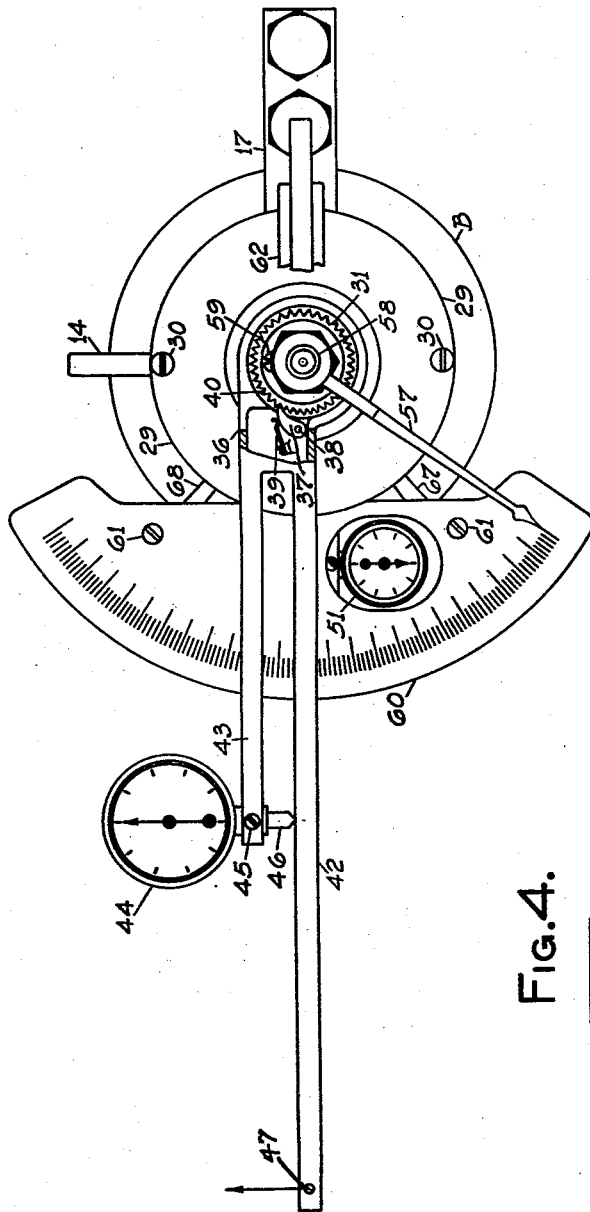
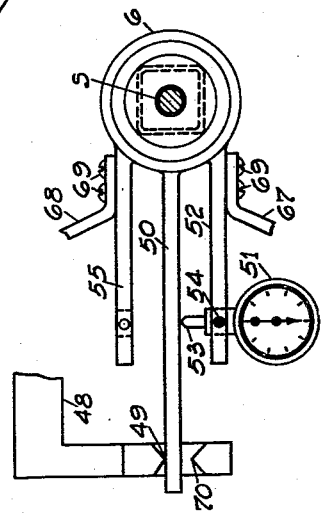
INVENTOR
F. C. Nilson,
BY Neil D. Preston,
his ATTORNEY Patented Feb. 11, 1936

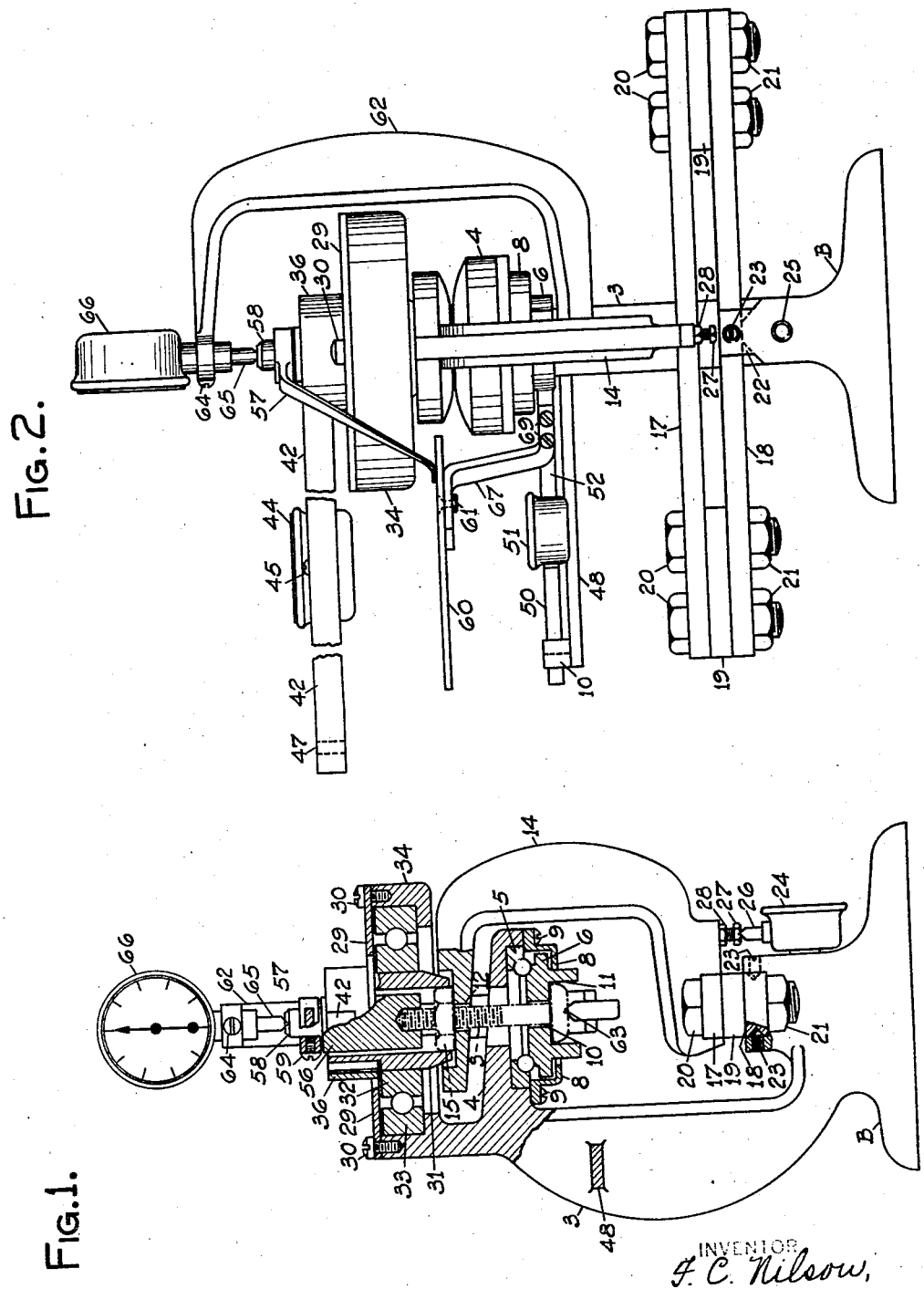

2,030,464

UNITED STATES PATENT OFFICE 2,030,464

TESTING DEVICE FOR THREADED ARTICLES

Frederick C. Nilson, Rochester, N. Y., assignor to General Railway Signal Company, Rochester, N. Y.

Application July 14, 1933, Serial No. 680,416

9 Claims. (Cl. 73—51)

This invention relates to testing devices, and more particularly to a device for subjecting articles such as screws or bolts to a plurality of different stresses and for observing the various reactions thereto.

In testing the material and construction of screws or bolts, it is found expedient to discover their ability to resist various stresses or forces which they may be subjected to in practical use by the use of testing implements arranged to apply various increments of such stresses or forces. It has been the practice to employ one device to subject the screws to various tensional stresses and another device to apply torsional stresses, but in as much as each of such stresses must then be applied individually, it is obvious that a practical condition is not thus set up, because in practical applications of such screws, the stress or force applied is often a combination of both torsion and tension.

In view of the above and other considerations, it is proposed in accordance with the present invention to provide a single device whereby manufactured articles, such as screws, or other threaded articles may be subjected to various increments of tensional stress as well as the natural torsional stress simultaneously obtaining therewith. It is also proposed to provide means for simultaneously reading the various effected values of both tensional and torsional stress as well as the effort required to effect such values. It is further proposed to provide a means for also simultaneously reading the resulting deformations in the tested screw or other article, such as the elongation and the angle of twist.

Other objects, purposes and characteristic features of the present invention will appear as the description thereof progresses, during which, references will be made to the accompanying drawings which show the invention in a manner to make it easily understood rather than with the view of showing the particular construction preferably employed in practice, and in which:—

Fig. 1 is a front elevational view of a device constructed in accordance with the present invention with parts broken away and other parts sectioned to more clearly show the construction.

Fig. 2 is a side elevational view of the device shown in Fig. 1.

Fig. 3 is a plan view of the device shown in Fig. 1 having certain parts sectioned and other parts removed.

Fig. 4 is a plan view of a detail of the device shown in Fig. 1.

Referring to the drawings, the present device is illustrated as assembled about a metal base member B having a rigid upright portion 3 with a general T-shaped cross section, and a lower bearing holding member 4 integral with the upright portion 3 extends horizontally above the base B. The horizontal surface of this lower bearing holding member 4 is circular with an annular recess receiving an upper race 5 of a ball bearing, or any suitable anti-friction bearing, and a lower race for this bearing is provided by a wrench member 6 arranged to receive the head of the screw or bolt to be tested. The upper race 5 is retained by a ring 8 held by screws 9 to the bearing holding member 4, and the center portion of this ring 8 extends downwardly and inwardly to retain the wrench member 6, but is spaced so that physical contact is not made therebetween when the wrench member 6 is in its uppermost position.

Any screw, bolt or other threaded article which is to be tested, such as the screw S shown in dot and dash lines in the accompanying drawings, is inserted with the body portion extending upwardly through an enlarged hole 10 in the wrench member 6 so that the head of the screw S rests in a square recess 11 to prevent turning of this screw head relative to the wrench member 6. Although the wrench member 6 is shown as adapted to receive a square head screw or bolt, various other shaped wrench members or grips may of course be provided to accommodate other sizes or shaped ends of articles to be tested.

The body of the screw S also extends through an enlarged hole 12 in an offset vertical thrust member 14, and the upper end of this thrust member 14 has a circular recess concentric with the hole 12 for receiving a nut 15 threaded upon the body of the screw S, which nut 15 may obviously be either a part of the testing device or a part of the tested article according to whether the test is to be made on the screw alone or is to include both the screw and nut. The lower end of the thrust member 14 is separated from the base B by a dynamometer formed by an upper spring steel bar 17 separated at each end from a similar lower steel bar 18. Metal separators 19 are held between these bars 17 and 18 by through bolts 20 and nuts 21, and the lower bar 18 is retained on a raised portion 22 of the base B by screws 23 threaded through upwardly extending sides of the raised portion 22, and inwardly extending pointed ends of these screws 23 are forced into indentations in the bar 18, which indentations are spaced slightly upwardly from the alinement of the screws so that the pointed ends of the screws 23 force the bar 18 tightly against its lower support 22. In turning the nut 15 down on the screw S, there is obviously a tendency to rotate the vertical thrust member 14 due to the friction between the nut and the top of the thrust member, but such rotation is prevented by downwardly extending sides on the lower end of the thrust member 14 which engage the sides of the top dynamometer bar 17.

It is now obvious that any tensional stress effected within the screw S by tightening the nut 15 thereon is reflected through the thrust member 14 upon the dynamometer bars 17 and 18, or that is, the upright portion 3 and the bearing holding member 4 may be considered to hold the head of the screw S in fixed relationship to the center support 22 for the lower bar 18, and the vertical force exerted relative thereto by turning down the nut 15 is transmitted through the thrust member 14 in a manner to compress the spring bars 17 and 18. The deflection or compression of the dynamometer bars 17 and 18 will then obviously increase as the longitudinal force increases between the nut 15 and the head of the screw S, and if the bars 17 and 18 are so constructed that their elastic limit is not reached by the maximum stress obtaining in the tested screw, it may be considered that this deflection of the bars is entirely proportional to the tensional stress within the screw S.

A convenient means for determining this force as reflected by the dynamometer bars 17 and 18 may be provided by a conventional dial reading micrometer 24 mounted in any convenient manner such as by a rigid coupling means threaded into a tapped hole 25 in the vertical portion of the base B. The actuating plunger 26 of the micrometer 24 projects upwardly to engage an adjusting screw 27 threaded into the vertical thrust member 14. The screw 27 may be adjusted and locked by a nut 28 so that a zero reading is obtained on the micrometer 24 when no force is being exerted on the dynamometer bars, and a predetermination of the dial readings in force may be made by applying various known increments of force to the dynamometer bars and observing the resultant readings of the micrometer 24, from which readings, a scale reading directly in force may be computed and marked upon the dial, or a factor may be recorded for converting the divisions of the dial into their equivalent forces.

The tensional stress within the screw S which may be measured by the dynamometer arrangement just described is to be applied by turning the nut 15 downwardly upon the body of the screw S, and a means is herein provided for observing the amount of turning effort required to effect the various tensional stresses. This means comprises a socket wrench 31 adapted to fit over the nut 15, and this socket wrench 31 is held within an inner antifriction bearing race 32 with its associated outer race 33 held within a horizontal bearing holding member 34 by a ring 29 retained by screws 30, and the member is shown as being integral with the upright portion 3 of the base B. The socket wrench 31 may thus be turned on a vertical axis in alinement with the screw S with a minimum friction and is also guided to most effectively transmit the turning effort to the nut 15. The socket wrench shown is adapted to fit a hexagonal nut, but of course various other wrenches or grips may be provided to accommodate the various sizes or shapes of nuts to be tested.

A conventional ratchet arrangement is provided for turning the socket wrench 31 which is illustrated in Fig. 3 as comprising a hub member 36 carrying a pawl 37 operable about a pivot 38 and biased by a spring 39 to engage detents 40 on the periphery of the top portion of the socket wrench 31. This ratchet arrangement obviously transmits a clockwise rotation of the hub member 36 to the socket wrench 31, but allows a counterclockwise rotation of the hub 36 without effecting a corresponding movement of the wrench 31.

A means for determining the amount of turning effort applied to the socket wrench 31 is provided by a flexible steel arm 42 fixed to the hub 36 with a hole 47 in its extreme end at which point the force on the bar 42 is applied to maintain a constant moment arm for the turning force. A rigid arm 43 is also attached to the hub 36 and extends parallel to the flexible arm 42 with a dial reading micrometer 44 fixed to its extreme end by a screw 45 so that the pointed end of a micrometer actuating member 46 engages the side of the arm 42 in a manner to obtain a zero reading on the dial of the micrometer 44 when no force is applied to the arm 42. Inasmuch as it may be considered that the deflection of the flexible arm 42 is proportional to the force applied thereto at the point 47, it is obvious that a scale may be predetermined by applying known increments of force to the arm 43, and considering the length of this arm, the micrometer 44 may be arranged to read directly in terms of the turning effort applied to the socket wrench 31.

A part of the effort applied to screw the nut 15 upon the body of the screw S is obviously expended in overcoming the friction between vertical thrust member 14 and the lower surface of the nut 15, but the effort required to overcome the resistance of the screw threads is obviously resisted by the wrench member 6 holding the head of the screw S. Inasmuch as it is desirable to determine the resistance of such threads or the resultant torsion in the body of the screw S, a means has been provided by which the force resisted by the wrench member 6 may be directly observed simultaneously with the reading of the effort applied to the nut 15. This means comprises a rigid L-shaped arm 48 extending horizontally from the upright member 3 and having a vertical knife-edge surface 49 engaging the side of a flexible steel arm 50 extending horizontally from the wrench member 6. A dynamometer arrangement similar to that employed for determining the turning effort of the socket wrench 31 is formed as shown in Fig. 4 from this flexible arm 50 and a dial reading micrometer 51 held by a rigid arm 52 which is also carried by the wrench member 6 so as to extend parallel to the flexible arm 50. A rigid arm 55 similar to the arm 52 but disposed on the opposite side of the flexible arm 50 is also provided on the wrench member 6 for the purpose of testing articles having left-hand threads as will be more fully described hereinafter.

It is obvious that an actuating plunger 53 of the micrometer 51 engaging the side of the flexible bar 50 may be adjusted by regulating the position of the micrometer 51 on the arm 52 and then held by a screw 54 so that a zero reading is obtained when the wrench member 6 is not resisting a turning effort exerted by the head of the screw S. It may also be considered that the deflection of the flexible arm 50 will be proportional to the turning force resisted by the wrench member 6, and the scale of the micrometer 51 may be predetermined in the manner previously described in connection with micrometer 44 to read directly in terms of the turning effort resisted by the wrench member 6.

A permanent twist or set will take place in the body of the screw S as greater increments of effort are applied to the nut 15, and it is contemplated to also observe such twist simultaneously with the various other observations. An elongated cap nut 56 is provided for this purpose which is threaded upon the end of the screw S so that the top of the threaded hole in the nut 56 is drawn tightly against the end of the screw S to thereby turn with the body of the screw. A pointer 57 is held upon a reduced end 58 of the cap nut 56 by a screw 59, which pointer 57 moves about an arcuate graduated dial or protractor 60 which is fixed relative to the head of the screw S. A convenient means for holding the dial 60 is shown as two vertically offset radial arms 67 and 68 holding the dial 60 by bolts 61, and these arms may be fixed respectively to the arms 52 and 55 on the wrench member 6 by screws 69 or if the dial were carried by a fixed part, and not by the wrench 6, accurate readings of permanent twist could be taken only at times when the turning force on arm 42 is not present.

It is also obvious that a slight stretch or elongation will occur as the screw S is subjected to tensional and torsional stresses, and an extensometer is provided for directly reading such elongation also simultaneously with the other observations. This extensometer comprises an offset rigid arm 62 having a pointed lower end 63 resting in an indentation in the center of the head of the screw S, and a dial reading micrometer 66 is adjustably held in the upper end of the arm 62 by a screw 64 so that the point end of its actuating plunger 65 rests in an indentation in the center of the top end of the cap nut 56. The micrometer 66 may then be adjusted in the arm 62 so that a zero reading is obtained when no tensional stress is applied to the screw S, and the dial will then read directly the elongation of the screw as it is subjected to the various increments of stress.

In operating the above testing device, it is necessary to assemble various parts after the screw to be tested has been inserted in its proper position, and it is contemplated that the rather simple form shown may be modified greatly to make the device more conveniently operable from this standpoint, and yet fall within the scope of the present invention. In removing a screw after testing, or when testing articles having left hand threads, it is obvious that the single direction ratchet means for operating the socket wrench cannot be operated, as shown, to transmit the necessary counter-clockwise direction of rotation to the nut of the tested screw, but for this purpose, it is contemplated that the drive part of the ratchet arrangement including the ratchet pawl may be inverted on the socket wrench 31 so that counter-clockwise operation of the arm 42 may then be transmitted to the nut 15.

The readings of the micrometer 44 when the ratchet arrangement is thus inverted will obviously be the turning effort applied to the nut the same as before, and the observation of these readings may also be valuable in testing articles having right hand threads for determining the holding power of lock washers, or the like, placed beneath the nut for test purposes. When the ratchet arrangement is thus inverted, the micrometer 44 may of course be inverted in its holding arm 43 for convenience in reading. The turning effort resisted by the head of screw S when the nut 15 is turned in a counter-clockwise direction may be observed by changing the micrometer 51 from the arm 52 to the arm 55, thereby allowing the micrometer 51 to register the deflection of the flexible arm 50, the outer end of which engages a knife-edge stop 70 on the rigid arm 48. It is also contemplated that, in testing certain screws, a twist or permanent set which is greater than can be measured by a single traversal of the dial 60 by the pointer 57 will obtain before fracture occurs in the tested screw, and in such a case, the pointer may be reset to zero and the final reading obtained by totaling the various traversals of the dial.

Provision has now been made in the present device for simultaneously observing the effects of practically every stress which a screw or bolt undergoes in a practical application inasmuch as the compound stresses to which a screw is subjected while being installed in its particular application is duplicated in the present testing device. In other words, the present testing device provides a means for directly observing the effort required to screw a nut upon a screw or bolt to obtain various clamping pressures therebetween, which clamping pressures are continuously registered by a dynamometer means. An observation of the required effort in turning down nuts on screw threads is especially valuable in comparing the effort required to effect a definite clamping force or tension within the screw for various types or various pitches of screw threads, as well as in observing the maximum force which screw threads in various materials can withstand before failure.

The torsion within the screw effected by the resistance of the screw threads to the turning of the nut thereon is likewise indicated coincidentally with the above observations by a direct reading dynamometer means, and it is contemplated that this observation will be valuable not only in determining the effect of torsion in combination with tension on various screw materials but also in making comparisons between various designs of screw threads and the friction offered by various materials. The angle of twist or permanent set and the elongation of the tested screw may also be observed simultaneously with the various observed values of tension and torsion which is obviously valuable because the practical duplication of the combination of both tension and torsion obtained herein may produce resultant twists and elongations which cannot ordinarily be observed by individual tests of tension and torsion.

In describing the present invention, attention has been directed to one specific embodiment thereof, without attempting to point out the various alternate or optional features of construction, or the different organizations or combinations that may be employed.

In other words, the particular embodiment of the present invention has been selected to facilitate in the disclosure thereof rather than to limit the number of forms which it may assume.

Having thus described my invention, what I claim is:—

1. In a testing device for screws, means for subjecting a screw to variable tensile and torsional stresses, means for measuring said tensile stresses, means for measuring the efforts required to effect said stresses, means for measuring torsional stresses obtaining simultaneously with said tensile stresses, and means registering the linear and twisted deformation resulting from said tensile and torsional stresses.

2. In a testing device for screws, means operating on the threads of a screw for effecting various tensile and torsional stresses therein, means for measuring said tensile stresses, means for measuring the effort required to effect said tensile and torsional stresses, means for measuring torsional stresses obtaining in said screw due to the resistance of the screw threads to the turning of said operating means thereon, and means registering the linear and twisted deformations resulting from said tensile and torsional stresses.

3. In a device for testing bolts, a member receiving the head of a bolt, a member operable to transmit turning effort to a nut threaded on said bolt, means for measuring said turning effort transmitted to said nut, a dynamometer means for measuring the resulting clamping force between the head of said bolt and the nut on said bolt, and means for measuring the torsion produced within said bolt by the turning of the nut thereon.

4. In a device for testing a bolt and nut, supporting means for the bolt, means for turning the nut on said bolt which means has an arm adapted to be flexed in proportion to the turning force, a gauge actuated by the deflection of said arm to indicate said turning force, a dynamometer means disposed relative to the nut and the head of the bolt to indicate the tension effected in said bolt by the turning of said nut thereon, and means for measuring the portion of the turning force applied to the nut which is resisted by the head of the bolt.

5. In a device for testing bolts and nuts, means for turning a nut on a bolt and having an arm capable of being flexed in proportion to the turning force, means actuated by deflection of said arm to indicate the turning force, dynamometer means to indicate the tension effected in the bolt by the turning of the nut thereon, a gauge for indicating that portion of the turning force applied to the nut which is resisted by the head of the bolt, a gauge for measuring a change in length of the bolt, and means for indicating twisted deformation of the body of the bolt.

6. In means for testing screws, a rotatable member for fixedly receiving the head of a screw, a threaded member for operating on the threads of the screw, longitudinal force indicating means arranged relative to the rotatable member and the threaded member to indicate tension in the screw resulting from operation of the threaded member on the screw, force indicating means arranged to prevent rotation of the rotatable member, and a force measuring means operable to rotate said threaded member.

7. In a device for testing a screw, a rotatable member for receiving the head of a screw, a threaded member for operating on the threads of the screw, a longitudinal force measuring means arranged to function as of between said rotatable member and said threaded member, a force indicating means for preventing rotation of the rotatable member, a force indicating means operable to rotate the threaded member, an extensometer arranged to indicate change in length of the screw, and means for indicating twist deformation of the screw.

8. In a device for testing bolts, a rotatable member for receiving the head of a bolt, a nut threaded on the bolt, resilient means positioned to resist movement of the nut toward the rotatable member, a wrench receiving the nut, a resilient arm operable to turn said wrench in a manner to deflect said resilient means, a gauge for measuring the deflection of the resilient arm, a gauge for measuring the deflection of the resilient means, a non-rotatable resilient arm attached to said rotatable member in a manner to flex in proportion to the resistance offered by the threads of the bolt to the turning of the nut thereon, and means for measuring the deflection of the non-rotatable resilient arm.

9. In a device for testing bolts, a rotatable member for receiving the head of a bolt, a nut threaded on the bolt, resilient means resisting movement of the nut toward the rotatable member, a wrench receiving the nut, a resilient arm operable to turn the wrench in a manner to deflect the resilient means, a gauge for measuring the deflection of the resilient arm, a gauge for measuring the deflection of the resilient means, a non-rotatable resilient arm attached to the rotatable member so as to flex in proportion to the resistance offered by the threads of the bolt to the turning of the nut thereon, a gauge for measuring the deflection of the non-rotatable resilient arm, a micrometer for measuring the length of the bolt, a protractor fixed relatively to one end of the bolt, and a pointer fixed relatively to the other end of the bolt and registering on the protractor.

FREDERICK C. NILSON.